Nov. 4, 1952 J. W. BROWN ET AL 2,616,424
MEDICATION UNIT
Filed May 12, 1950
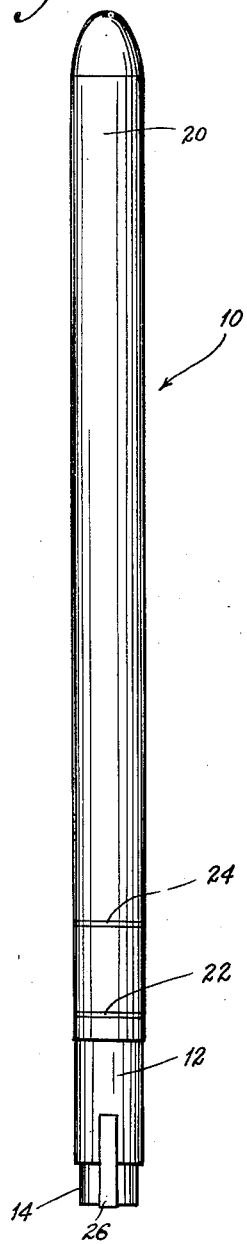
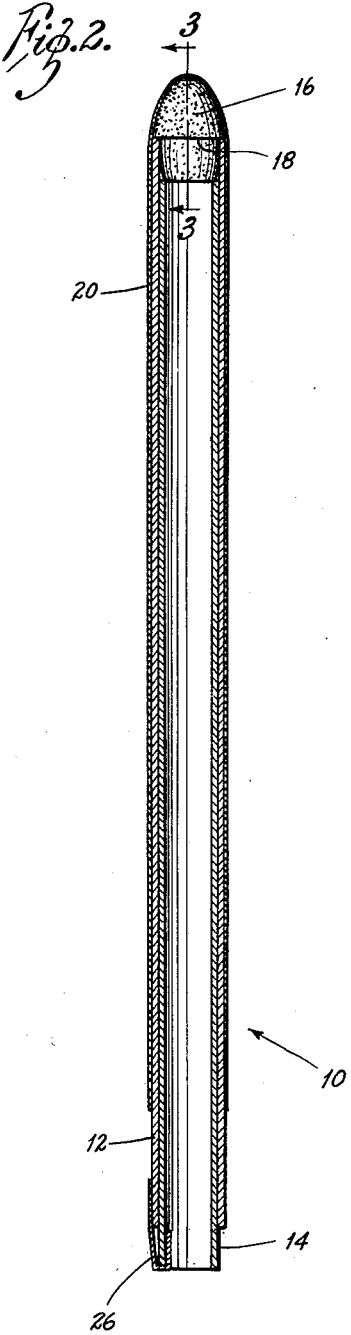
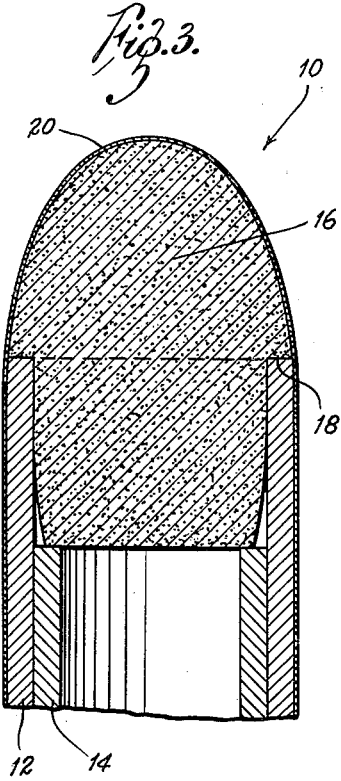
INVENTORS:
JOHN W. BROWN,
JOHN T. DONNELL,
BY Kingsland, Rogers & Ezell
ATTORNEYS Patented Nov. 4, 1952

2,616,424

UNITED STATES PATENT OFFICE 2,616,424

MEDICATION UNIT

John W. Brown, Kimmswick, and John T. Donnell, Barnhart, Mo.

Application May 12, 1950, Serial No. 161,632

3 Claims. (Cl. 128—264)

The present invention relates generally to devices for treating animals, and more particularly to a sanitary disposable medication unit for introducing medication into the uterus or vagina of postparturient animals.

In brief, the present invention comprises two telescopic tubes of relatively light disposable material and of substantially the same length. Into one end of the outer tube is snugly inserted a medication, which is illustrated as a bolus, but which may take liquid or gaseous forms in suitable containers. The medication is adapted to be ejected by the inner tube into the animal after which the two tubes are destroyed to avoid the possibility of infection to human handlers or to other animals. A protective coating, which may be medicated, covers the medication and the insertive length of the outer tube.

There has long existed the need of a medication unit by means of which a farmer, dairyman, or other person not skilled in veterinary methods may, with safety to the animal and to himself, deposit a medicated bolus or other medication in the uterus or vagina of an animal, for example, of a cow after calving to assist the removal of the "afterbirth" and to prevent or overcome any puerperal infections. The need has existed for such a medication unit of disposable character which is constructed to encourage use of the same so that animals may remain healthy and continue to perform their functions.

Therefore, an object of the present invention is to provide a novel medication unit for animals comprising a disposable body adapted to be readily destroyed after use of the unit.

Another object is to provide a novel medication unit for animals by which medication may be deposited in the uterus or vagina of animals by one unskilled in veterinary methods without injury to the animal, and without danger of personal infection.

Another object is to provide a novel medication unit for animals by which a bolus or other medication may be easily and readily deposited in the uterus or vagina of an animal, for example, in the uterus of a cow after calving.

Other objects are to provide a novel medication unit for animals which is of a sturdy yet light construction, which includes a disposable body which may be destroyed after the medication has been deposited as required, which slides into the animal readily, which is particularly adapted for use by farmers, or the like, unskilled in veterinary practices, which is sanitary both as respects the animal being treated and the individual employing the device, which is inexpensive, thereby encouraging the use of the same with the resultant excellent effect upon the animals, and which is of a form convenient for storage in a barn, or the like, thereby further encouraging the use of the same.

The foregoing and other objects and advantages are apparent from the following description taken with the accompanying drawing, in which:

Fig. 1 is an elevational view of a medication unit constructed in accordance with the teachings of the present invention;

Fig. 2 is a central longitudinal cross-sectional view through the medication unit shown in Fig. 1; and Fig. 3 is an enlarged longitudinal cross-sectional view on substantially the line 3—3 of Fig. 2.

Referring to the drawing more particularly by reference numerals, 10 indicates generally a medication unit incorporating the principles of the present invention. The medication unit 10 comprises telescopic outer and inner tubes 12 and 14, respectively, which are of substantially the same length. A bolus 16 is snugly seated in one end of the outer tube 12 and comprises the medication to be deposited in the uterus or vagina of an animal. The bolus 16 preferably has a rounded free end of dome form, and an annular shoulder 18 of a depth equal to the thickness of the tube 12 to obviate an otherwise sharp edge. A protective coating 20 covers the exposed portion of the medicated bolus 16 and the outer tube 12 to a line 22, the line 22 indicating the depth to which the unit 10 will be inserted in a large cow. A line 24 indicates such depth for a small cow. A suitable coating material is sodium carboxymethylcellulose which is applied as a liquid, dries, and then becomes gelatinous from contact with the moist lining of the vagina and uterus of the animal to render insertion easy. A quaternary ammonium compound may be added to the coating material as a sterilizer and additional medicament.

Considering Fig. 2, it is to be noted that the inner tube 14 abuts the medicated bolus 16 at one end and extends outwardly from the outer tube 12 at the other end by an amount substantially equal to the depth of the medicated bolus 16 disposed in the outer tube 12. A flexible tape or string 26 is secured to the outer tube 12 and to the inner tube 14 to prevent the inner tube 14 from slipping out rearwardly and from accidentally remaining in the animal. The medicated bolus 16 is shown in a preferred form, being rounded in its exposed portion to avoid injury to the internal tissues of an animal and being slightly conical in the seated portion to facilitate snug and ready mounting in the end of the outer tube 12 (Fig. 3). The total taper is not enough to prevent firm engagement of the top of the inner tube 14 with the base of the bolus 16.

The medicated bolus 16 is snugly seated in the end of the outer tube 12, but may be readily ejected for deposit as required, preferably by applying a pressure to the exposed end of the inner tube 14 by the thumb of the hand which is grasping the outer tube 12. After the medicated bolus 16 is deposited, the telescopic tubes 12 and 14 are withdrawn and destroyed, as by burning, in order to prevent possible infection of the individuals handling the medication unit 10, and of other animals.

The tubes 12 and 14, which may be of any selected cooperative cross sections, are preferably of cardboard, or other lightweight disposable material, and are of sufficiently light construction to avoid damage to the inner tissues of an animal being treated. It is well known that only a very small percentage of calvings and the like are attended by veterinarians, and, therefore, it is essential that the medication unit for treating the animal after calving or the like be of a construction for easy, ready handling by a farmer, dairyman, or the like, not used to handling medical instruments.

It is apparent that there has been provided a medication unit which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. A medication unit for animals comprising, in combination, an outer tube, an inner tube telescopically engaging said outer tube, a medicated bolus snugly disposed in one end of said outer tube, and a protective coating over said medicated bolus and over a substantial portion of the outer tube adapted to become gelatinous upon contact with moisture, said inner tube abutting said medicated bolus at one end and extending from said outer tube at the other end, said medicated bolus being ejectable by movement of said inner tube thereagainst.

2. A medication unit for animals comprising, in combination, an elongated hollow member, a medicated bolus snugly mounted in one end of said member for ejection therefrom, said bolus including a shoulder engaging the end of said hollow member and being of a depth to dispose the exposed surface of said bolus in position to form a continuation of the outer surface of said hollow member, said bolus having a rounded free end of dome form rendering insertion easy, and an internal member slidably disposed within said hollow member abutting said medicated bolus at one end and extending from the hollow member at the other end.

3. A medication unit for animals comprising, in combination, an elongated hollow member, medication snugly mounted in one end of said member for ejection therefrom, an internal member slidably disposed within said hollow member abutting said medication at one end and extending from the hollow member at the other end, and a flexible member connecting said hollow member and internal member preventing accidental discharge of said internal member from either end of said hollow member and permitting limited telescopic movement of said internal member with said hollow member.

JOHN W. BROWN.
JOHN T. DONNELL.

REFERENCES CITED

The following references are of record in the file of this patent:

UNITED STATES PATENTS

| Number | Name | Date |
| --- | --- | --- |
| 1,131,349 | Ellis | Mar. 9, 1915 |
| 2,052,314 | Perraton | Aug. 25, 1936 |
| 2,353,174 | McLaughlin | July 11, 1944 |
| 2,486,056 | Oclassen | Oct. 25, 1949 |
| 2,516,846 | Betz | Aug. 1, 1950 |
| 2,553,382 | Riordan | May 15, 1951 |

FOREIGN PATENTS

| Number | Country | Date |
| --- | --- | --- |
| 550,638 | Great Britain | Jan. 18, 1943 |